(12) United States Patent
Yamamoto (10) Patent No.: US 6,262,545 B1
(45) Date of Patent: Jul. 17, 2001

(54) DUAL SPEED MOTOR DRIVE CIRCUIT

(75) Inventor: Satoshi Yamamoto, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/559,208

(22) Filed: Apr. 24, 2000

(51) Int. Cl.[7] ............................................ H02P 1/18
(52) U.S. Cl. ........................ 318/254; 318/439; 318/138; 360/73.8
(58) Field of Search .................... 318/254, 439, 318/138; 360/73.03, 73.05, 73.08

(56) References Cited

U.S. PATENT DOCUMENTS

| | | | |
|---|---|---|---|
| 4,307,326 | 12/1981 | Fukushima et al. | 318/411 |
| 4,359,674 | 11/1982 | Gotou | 318/318 |
| 4,839,754 | 6/1989 | Gami et al. | 360/73.01 |
| 5,193,069 | * 3/1993 | Furuya | 364/708 |
| 5,532,563 | * 7/1996 | Kodama et al. | 318/440 |
| 5,579,186 | * 11/1996 | Yamamoto et al. | 360/75 |
| 5,659,799 | * 8/1997 | Wu et al. | 395/877 |
| 5,661,382 | * 8/1997 | Enami et al. | 318/439 |
| 5,940,284 | * 8/1999 | Troutman | 363/60 |
| 5,953,176 | * 9/1999 | Shimazu et al. | 360/73.03 |
| 5,982,570 | * 11/1999 | Koizumi et al. | 360/69 |

* cited by examiner

*Primary Examiner*—Robert E. Nappi
*Assistant Examiner*—Rina I. Duda
(74) *Attorney, Agent, or Firm*—Lumen Intellectual Property Services, Inc.

(57) ABSTRACT

A dual speed hard drive system designed to operate at the highest efficiency in the low RPM mode, and at the highest performance in the high RPM mode. To achieve the highest efficiency in the low RPM mode, the spindle motor is optimized for maximum efficiency for low RPM speeds using the standard supply voltage of +5.0 V. To achieve the highest performance, a DC—DC step up converter increases the supply voltage to beyond the standard +5.0 V supply voltage thereby allowing the spindle motor to achieve a higher RPM. A 2-stage spin up process is utilized when the spindle motor is retired to go from a stationary state to the high RPM mode. This 2-stage spin up process minimizes the power capacity requirement and the thermal rise of the DC—DC step up converter during operation.

26 Claims, 11 Drawing Sheets

DUAL SPEED MOTOR DRIVE CIRCUIT

FIELD OF THE INVENTION

The present invention relates to the spindle motor control in hard disk drives and more particularly to dual mode spindle motor control in hard disk drives to provide a high-efficiency mode and a high-performance mode in portable computing devices.

DESCRIPTION OF THE RELATED ART

Portable computing devices, particularly notebook computers, are gaining popularity in recent years due to their compact size, weight, and mobility. Notebook computers can operate either from AC power or from battery power. However, unlike AC power, battery power will get depleted as the notebook is being operated. The hard disk drive (HDD) is one of the devices in a notebook that uses large amounts of power when in operation. Therefore, the spindle motors in hard disk drives are intentionally operated at low speeds, measured in revolutions per minute (RPM), to minimize power consumption during battery operation. The trade-off for this lower power consumption is a decrease in RPM of the spindle motor which directly leads to a decreased performance in data access time.

When AC power is in use, power consumption is less of a concern as AC power is practically unlimited. High performance becomes more important in a hard disk drive than low power consumption. In this situation, it is desirable to have the spindle motor in the hard disk drive spin at a significantly higher RPM to allow faster data retrieval.

In a conventional spindle motor system, an main processor unit (MPU) is used to control a spindle motor driver, which in turn supplies a current sufficient to achieve a desired RPM to drive the spindle motor. The spindle motor driver sends back spindle motor RPM readings to the MPU and the readings are compared to a desired RPM. Based on this comparison, the MPU sends a signal to the spindle motor driver to either increase or decrease the current supplied to the spindle motor to increase or decrease the motor RPM to the desired RPM.

A dual-speed disk drive has the unique requirement in that the lowest RPM operating mode should have the highest efficiency. The purpose of a dual-speed disk drive is to minimize battery power consumption in the low RPM mode and maximize performance when operating on AC power in the high RPM mode.

Figure 1:
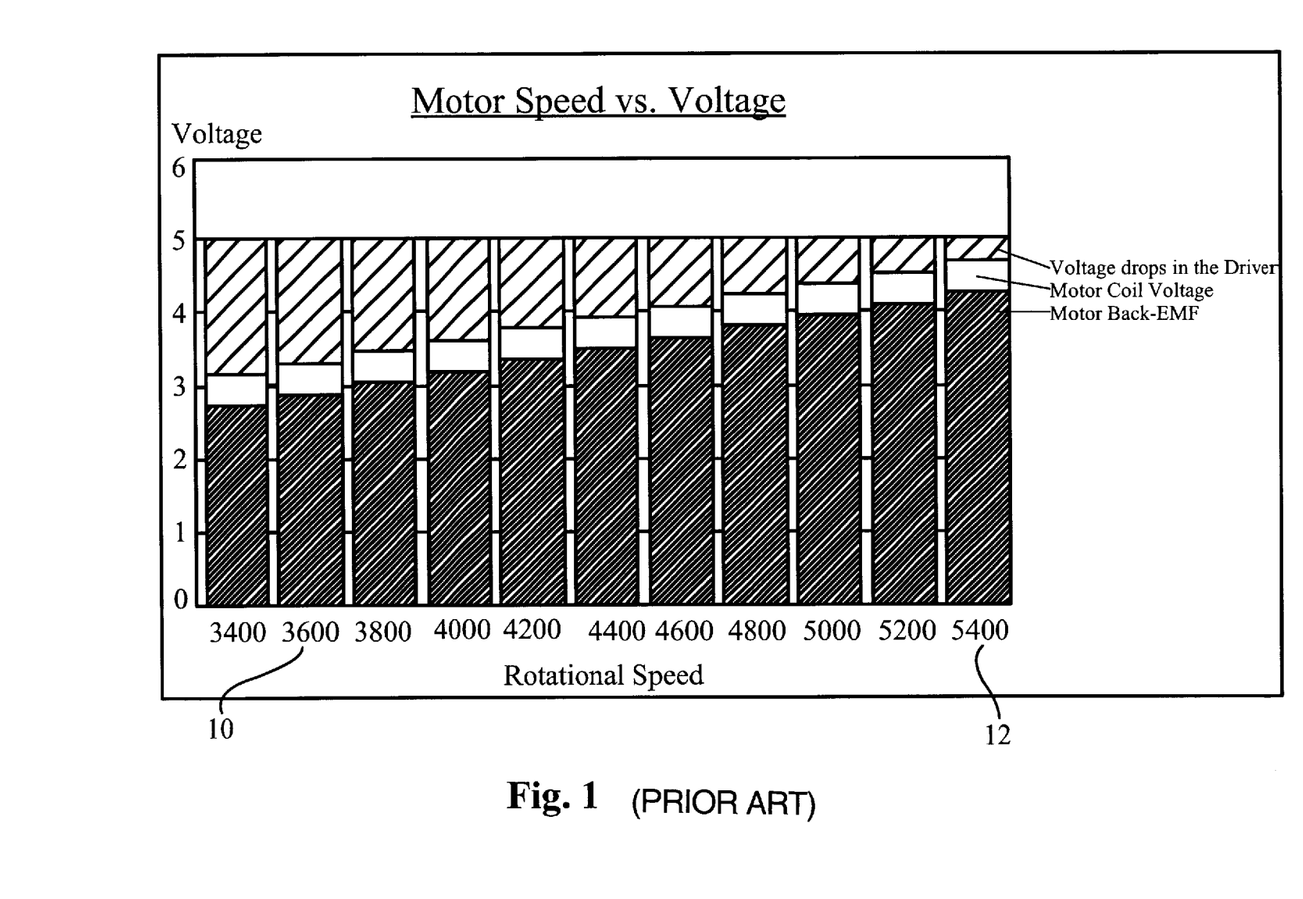
FIG. 1 is a graph illustrating prior art linear motor driver voltage drop at different RPMS.
Figure 2:
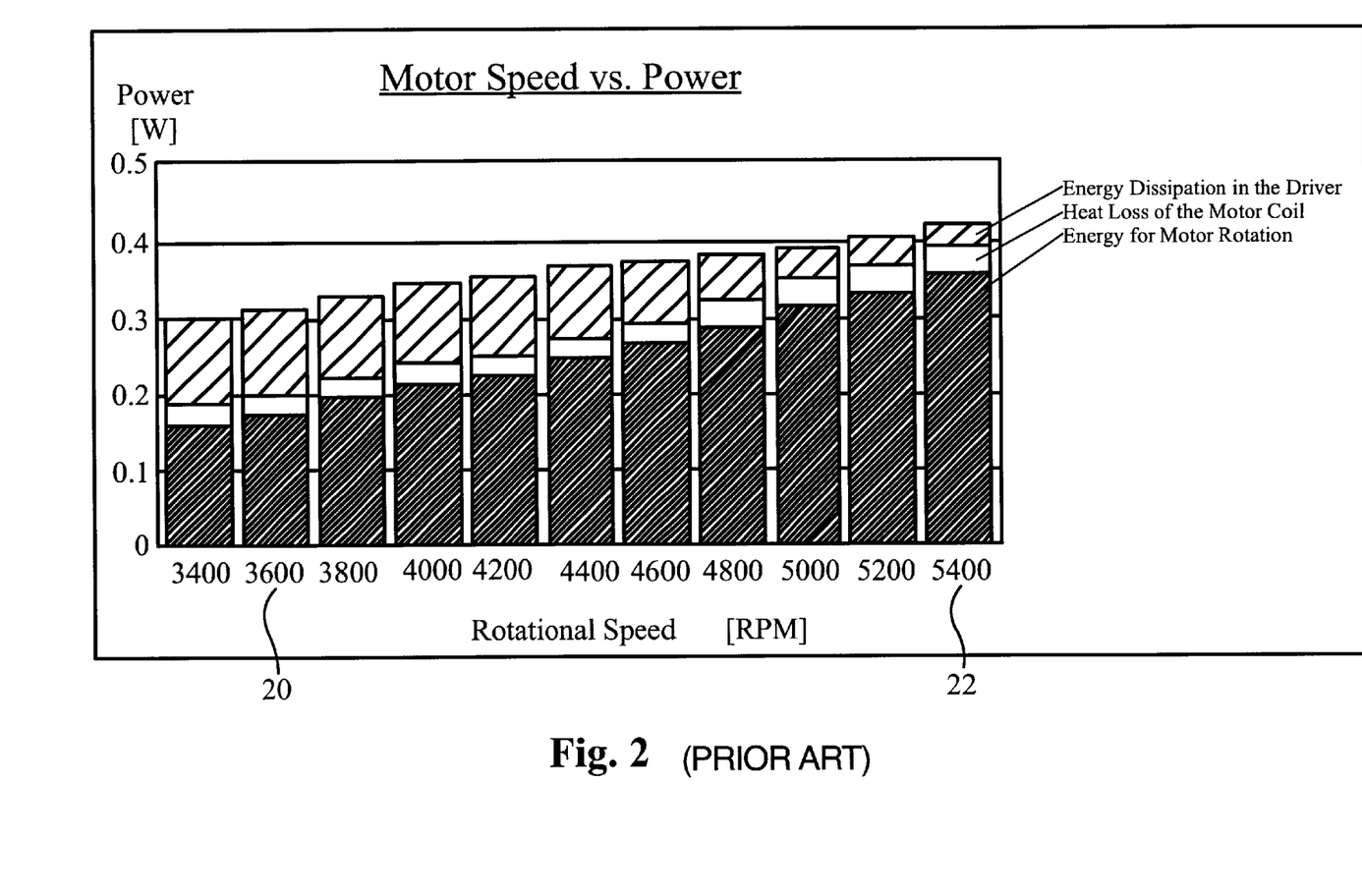
FIG. 2 is a graph illustrating prior art linear motor driver power loss at different RPMs.

Operating a spindle motor at multiple RPMs from a fixed supply voltage can be done in several different ways. The simplest solution is to use a linear motor driver. However, a linear motor driver is the least efficient when operated at low RPMs which runs counter to the goal of minimizing power consumption at low RPM. Referring to FIG. 1 and 2, voltage plot 12 illustrates at high RPM, the back emf approaches the supply voltage and therefore voltage drop across the motor driver is small. Energy dissipation in the motor driver is also small (illustrated in power plot 22) and therefore high efficiency can be achieved. At low RPM, there is a significant voltage drop in the motor driver due to the decrease in back-emf as illustrated in voltage plot 10, resulting in significant energy dissipation (illustrated in power plot 20) in the motor driver's output transistors and therefore efficiency is very low.

Figure 3:
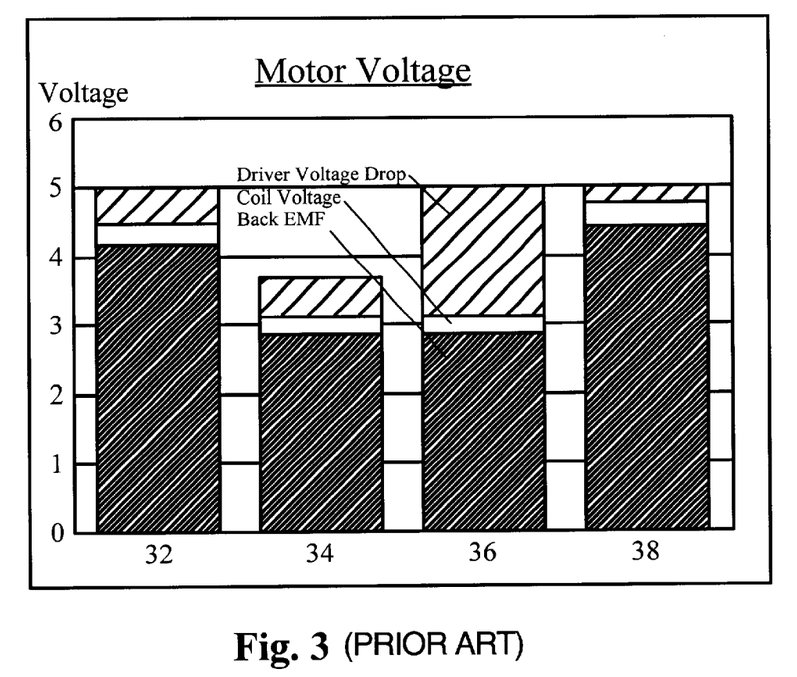
FIG. 3 is a graph illustrating voltage drops in prior art spindle motors optimized for 2 different RPMs.
Figure 4:
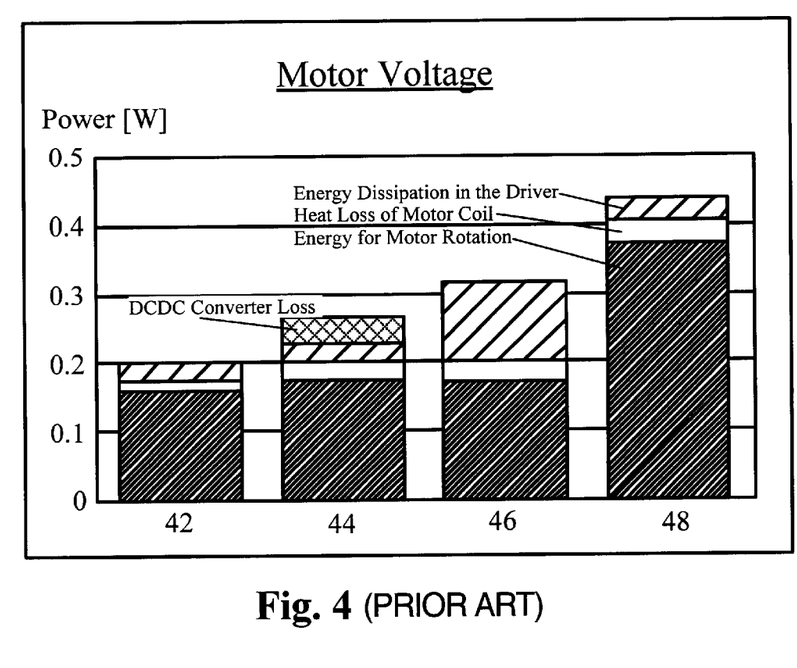
FIG. 4 is a graph illustrating power losses in prior art spindle motors optimized for 2 different RPMs.

Referring to FIGS. 3 and 4, spindle motors can be optimized in terms of attaining maximum efficiency at a given voltage for a desired RPM. For example, a spindle motor optimized for low RPM (e.g. 4200 RPM) at +5.0 V supply voltage exhibits a voltage plot 32 and a power plot 42. Voltage drop and energy dissipation in the motor driver is small therefore efficiency is high. However, using a spindle motor that is optimized for low RPM at the standard +5.0 V supply voltage would mean that the spindle motor would not be able to run at a higher RPM at this standard voltage. This is undesirable when high performance is required.

On the other hand, a spindle motor optimized for high RPM (e.g. 5400 RPM) at +5.0 V supply voltage exhibits a voltage plot 38 and a power plot 48. Again, a small voltage drop and a small energy dissipation makes the spindle motor highly efficient. A linear motor driver can be used to operate the spindle motor at 4200 RPM that exhibits voltage plot 36 and power plot 46. As illustrated, there is a significant voltage drop and energy dissipation across the motor driver greatly reducing the efficiency.

To achieve better efficiency when using a linear motor driver, voltage conversion techniques such as DC—DC voltage step down converters have been used to lower the effective supply voltage to the linear motor driver output stage. By lowering the supply voltage to the output stage to the lowest necessary voltage to maintain the desired RPM, voltage drop and hence energy dissipation can be minimized, dramatically improving the motor driver efficiency (see 34 in FIG. 3). However, DC—DC voltage step down converters usually have efficiency rates of only 80–90% thereby introducing a new power loss, which negates some of the gained efficiency. This can be illustrated in power plot 44. On top of the energy for motor rotation, heat loss of motor, and energy dissipation in the driver, there is a new loss called DC—DC Converter Loss.

Thus, using a DC—DC down converter in the low RPM mode to lower the effective supply voltage which introduces efficiency losses is undesirable.

Typical RPM of a spindle motor supplied by the standard +5.0 V voltage is in the range of 4000–5400 RPM. The high speed mode of dual-speed drives typically require 7200–10,000 RPM, which is often beyond the capability of a conventional +5.0 V spindle motor.

U.S. Pat. No. 4,307,326 describes the use of a sensing resistor and a switch to control the use of a DC—DC down converter at low current (normal load) to achieve high efficiency. The DC—DC down converter is bypassed with the switch at high current (high load) operation. The DC—DC down converter is not necessary in high current (high load) operations because the voltage drop across the motor driver is small and therefore the motor driver is already operating at maximum efficiency.

U.S. Pat. No. 4,359,674 describes the use of an on-time ratio of a switching semiconductor and a voltage controller to control the output voltage of a DC—DC down converter to achieve high efficiency over a range of spindle motor load operations.

U.S. Pat. No. 4,839,754 describes the use of adjusting the duty cycle of a switching regulator to control the DC supply voltage to control the speed of the spindle motor as well as to achieve high efficiency.

None of the prior art mentioned above is capable of producing the highest efficiency at low RPM speeds without introducing new power losses. There is also no mention of any solution to significantly increase the RPM of a spindle motor during high performance modes.

A need therefore exists for providing an spindle motor control having dual performance modes. One mode will be for high efficiency operation of the spindle motor at low RPM (3600 RPM for example) during battery power operation. The other mode will be for high performance operation which is achieved by significantly increasing the RPM (7200–10,000 RPM for example) of the spindle motor, during AC power operation.

SUMMARY OF THE INVENTION

A principle objective of the present invention is to provide a spindle motor control for a dual-speed HDD that has two performance modes. One mode is the high efficiency mode for use when in battery operation where power conservation is paramount. In the high efficiency mode, the spindle motor operates at a low RPM to conserve battery power. The spindle motor is optimized for this low RPM operation. The other mode is the high performance mode used when AC power is in use where high spindle motor RPM is desired to maximize data retrieve performance.

Another objective of the present invention is to provide a spindle motor that is capable of operating at significantly higher RPM utilizing the standard supply voltage of +5.0 V while keeping the same form factor to fit existing space limitations.

A further objective of the present invention is to provide a method that allows a spindle motor to spin-up from a stationary condition (zero RPM) to the high RPM mode operating RPM without using excessive energy, thereby 1) preventing an undesirable thermal rise and 2) reducing the capacity requirement of the DC—DC up converter to keep the size small.

In view of the forgoing objectives, the present invention provides a dual-speed spindle motor control that is capable of switching between a high efficiency mode and a high performance mode. The high efficiency mode is achieved by using a spindle motor that is optimized for low RPM at the standard +5.0 V supply voltage. In the high performance mode, the spindle motor is required to spin at a much higher RPM typically in range of 7,200–10,000 RPM. The high performance mode is achieved by using a DC—DC step up converter to boost the standard +5.0 V voltage supply to a predefined voltage that will enable the spindle motor to sustain the higher RPM. Although the DC—DC step up converter introduces a new power loss, this is insignificant since power is practically unlimited when AC power is used.

The switching operation is achieved by the use of a Field Effect Transistor (FET) switch that is operated by a signal controlled by the MPU.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which.

DETAILED DESCRIPTION OF THE EMBODIMENTS

Although the invention is described as embodied in a hard disk drive with a spindle motor, the invention also applies to other motor systems and applications requiring dual/multiple speed controls such as CD-ROM drives, DVD drives, floppy disk drives, and even video camcorders for example. Accordingly, the following preferred embodiment of the invention is set forth without any loss of generality to, and without imposing limitations upon, the claimed invention.

The present invention uses a spindle motor optimized to operated at the maximum efficiency with the full +5.0 V supply voltage for low RPM operation, and uses a voltage conversion circuitry to increase the standard +5.0 V supply voltage for higher RPM operation. Although the use of voltage conversion circuitry introduces some efficiency losses, unlike in the low RPM mode, this efficiency loss in the high RPM mode is insignificant as unlimited AC power is available.

Therefore, the use of a DC—DC step up converter not only allows for the use of a high efficiency motor at low RPM, but also allows the spindle motor to spin at a speed much higher than what is achievable by a conventional +5.0 V spindle motor.

Figure 5:
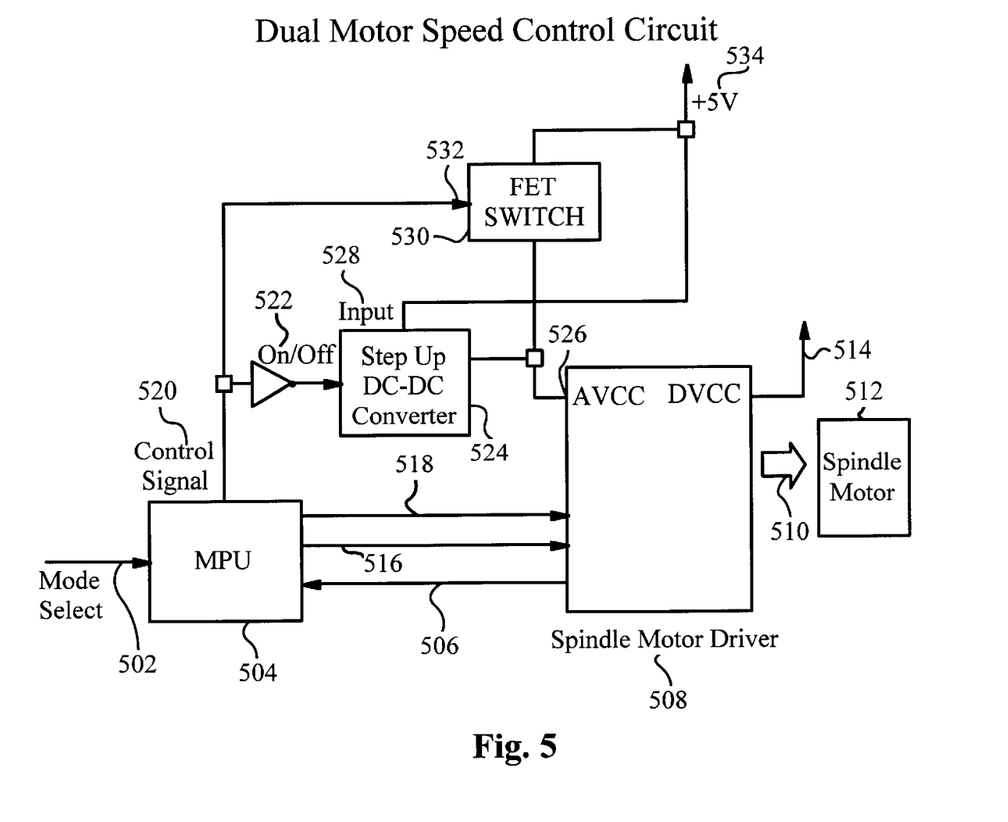
FIG. 5 is a simplified schematic showing a motor control circuit according to an embodiment of the present invention.

FIG. 5 is a simplified block diagram that illustrates an embodiment of the present invention. The circuit generally comprises of a field effect transistor (FET) switch 530, a DC—DC step up converter 524, a linear spindle motor driver 508, and a main processor unit (MPU) 504. The MPU 504 controls the spindle motor driver 508 through data signals 518 and clock signal 516. The spindle motor driver interprets the data signal 518 and either increases or decreases a current 510 supplied to the spindle motor 512 to control the spindle motor's speed. The spindle motor driver receives the supply voltage through the AVCC 526 node. The spindle motor driver 508 also sends back a spindle motor speed signal 506 to the MPU 504. The MPU compares this spindle motor speed signal 506 to a predetermined speed and sends the appropriate data signals 518 to the spindle motor driver 508 to increase or decrease the spindle motor speed. This feedback cycle continues during the operation of the spindle motor 512.

Although a linear spindle motor driver is used in the present embodiment, other drivers such as PWM motor drivers can be used.

FET switch 530 in the circuit provides a means to shut off the +5.0 V standard supply voltage 534 to the AVCC 526 of the spindle motor driver 508 during the high RPM mode. In the high RPM mode, the DC—DC step up converter 524 supplies the voltage to the AVCC 526 and hence it is necessary to shut off the standard +5.0 V supply voltage that is going through the FET switch.

Although a FET switch is used in this embodiment, other switching means can also be used. For example, an analog switch or a bipolar transistor can be used.

The purpose of the DC—DC step up converter is to boost the standard +5.0 V supply voltage to a higher voltage that is capable of driving the spindle motor 512 in the high RPM mode. It is turned on only during the high RPM mode.

In place of the DC—DC step up converter, other voltage conversion devices such as a switched-capacitor or a charge pump can be used.

The Mode Select 502 signal has two states, high and low. It is used to indicate to the MPU whether the spindle motor should be operating in the high RPM mode, in which case the Mode Select signal will be in the high state, or in the low RPM mode, and the Mode Select signal will be in the low state. The Mode Select signal will come from a external source and will be fed into the MPU 504.

The Control Signal 520 is used to control the FET switch 530 and the DC—DC step up converter 524. This signal comes from the MPU 504 and has two states, high or low. The MPU utilizes this signal to switch between the standard +5.0 V supply voltage 534 or the higher DC—DC step up converter supply voltage (e.g. +8.0 V) used during the high RPM mode.

TABLE 1

Component states in high and low modes of operation during normal operation.

| Mode Select Signal 502 | Control Signal 520 | FET Switch 530 | DC-DC Step Up Converter 524 | AVCC Voltage 526 |
|---|---|---|---|---|
| Low | High | On | Off | +5.0 V |
| High | Low | Off | On | +8.0 V |

The analysis of the operation of the circuit can be divided into high RPM mode and low RPM mode. Table 1 shows the component states in the high and low speed modes.

Low RPM Mode

The low RPM mode is selected when the Mode Select 502 signal is low. The Mode Select signal can be fed into the MPU 504 by the Central Processing Unit (CPU) or other external sources. When the Mode Select signal is low, the MPU will maintain the Control Signal 520 at high. The Control Signal 520 is fed into the gate of the FET Switch 530. Therefore, when the Control Signal 520 is high, the FET Switch 530 will be switched on, allowing the +5.0 V supply voltage to flow between the drain and the source and into AVCC 526.

The Control Signal 520 is passed through an inverter 522 (such as a NOT gate as shown in FIG. 5) before it is fed into the DC—DC step up driver 524. Therefore, when the Control Signal is high, the signal that is fed into the DC—DC step up converter is actually low and the DC—DC step up converter is switched off during the low RPM mode.

In the low RPM mode, the low RPM optimized spindle motor is operating at the maximum efficiency using the standard +5.0 V supply voltage. This meets the first requirement of prolonging the battery life by having high efficiency in the low RPM mode.

Figure 6:
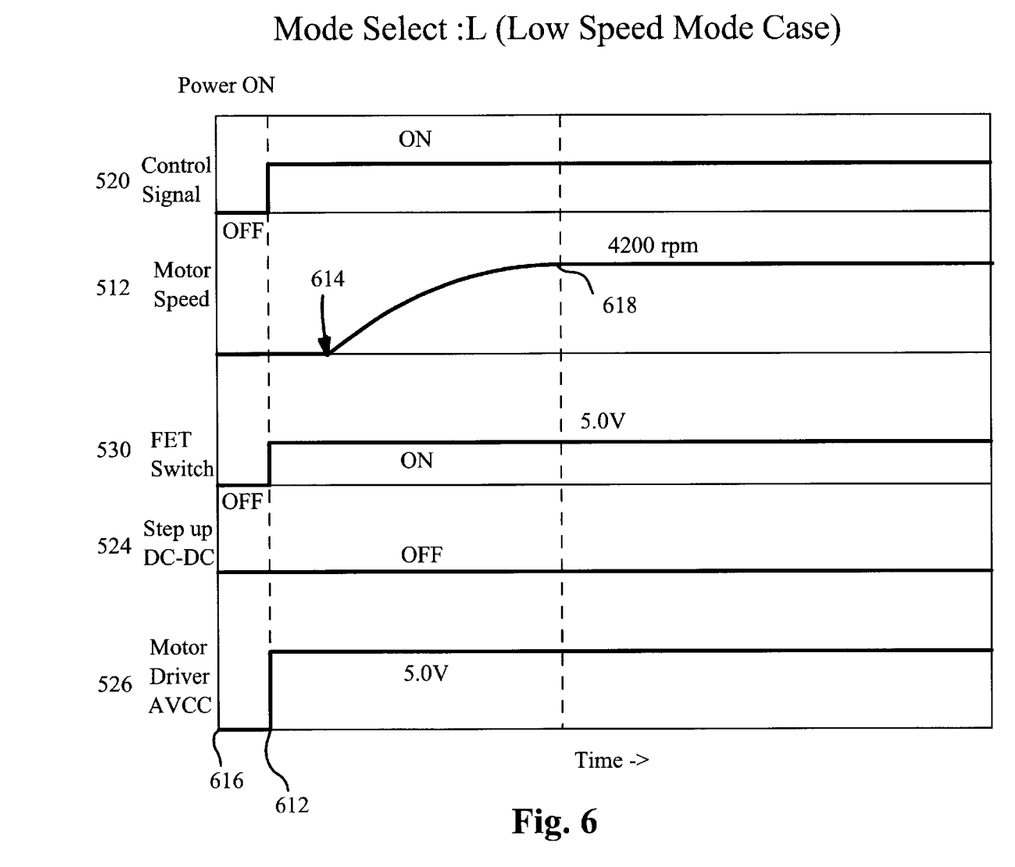
FIG. 6 is a timing diagram for a spindle motor control circuit in low RPM mode according to an embodiment of the present invention.

FIG. 6 is a timing diagram of the low RPM mode showing the component and signal states from the initial power off condition to the low RPM operating speed of 4200 RPM. When the power is off at time zero 616, the AVCC 526 is 0 V, the DC-DC step up converter 524 is off, the FET switch 530 is off, the motor speed is 0 RPM, and the Control Signal 520 is low.

By way of example, FIG. 6 depicts a timing diagram for a motor control circuit in a hard disk drive (HDD) of a notebook computer.

At some time 612, the power to the HDD is switched on and the HDD starts to spin up. The Mode Select 502 signal is low indicating that the low RPM mode is chosen. The MPU 504 receives this signal and switches the Control Signal 520 to high, and the Control Signal will stay high until the MPU receives a high Mode Select 502 signal or the notebook is switched off. This high Control Signal turns the FET switch 530 on, allowing the standard +5.0 V supply voltage to flow into AVCC 526. This is shown in FIG. 6 where the AVCC voltage jumps to +5.0 V at time 612.

The Control Signal 520 is converted from high to low through the inverter 522 and fed into the DC—DC step up converter. Since this signal is low, the DC—DC step up converter stays off and does not feed any voltage into AVCC 526.

There is a time delay from when the spindle motor driver 508 is supplied with the standard +5.0 V supply voltage at AVCC 526 to when the spindle motor 512 starts to spin-up. At time 614, the spindle motor 512 begins to spin and at time 618 the spindle motor reaches the target RPM, 4200 RPM in this case, and the circuit is in normal low RPM mode operation. The convention feedback control performed by the MPU 504 maintains the spindle motor 512 speed at 4200 RPM.

High RPM Mode

The high RPM mode is selected when the Mode Selector 502 signal is high. In the high RPM mode, the spin up of the spindle motor 512 from zero RPM to the high RPM mode operating RPM is done in two stages. The first stage utilizes the standard +5.0 V supply voltage to spin up the spindle motor 512 to the low RPM mode operating RPM. In this first stage, the circuit acts just like the circuit in the low RPM mode. When the target switchover speed is achieved by the spindle motor, the standard +5.0 V supply voltage is switched off by the FET switch 530 and the DC-DC step up converter 524 is switched on. The DC—DC step up converter supplies a voltage higher than +5.0 V to the spindle motor driver 508 allowing the motor driver to increase the current supplied to the spindle motor 512. With the increased current, the spindle motor continues to increase speed until the high RPM mode operating RPM is reached.

The Mode Select 502 signal can be fed into the MPU 504 by the CPU or other external sources. The MPU also receives a feedback spindle motor speed signal 506 from the spindle motor driver 508. The MPU will send out a high Control Signal, just like in the low RPM mode, if the feedback spindle motor speed signal 506 is lower than the target switchover speed. This high Control Signal 520 will turn the FET switch 530 on, and the DC—DC step up converter 524 off. This is the same condition as in the low RPM mode and the standard +5.0 V supply voltage is fed into AVCC 526. The spindle motor is supplied with the appropriate current to bring the spin speed up to the target switchover speed.

Once the MPU receives a feedback spindle motor speed signal that is equal to the target switchover speed, it will change the state of the Control Signal 520 to low. This will turn the FET switch 530 off since there is no gate voltage at the FET switch. This will shut off the standard +5.0 V supply voltage that is fed to the AVCC 526 through the FET switch.

At this point, the DC—DC step up converter will be turned on to generate a higher output voltage, +8.0 V in this case. This higher output voltage is fed into AVCC 526 which allows the spindle motor driver 508 to increase the current supplied to the spindle motor 512. The spindle motor 512 continues to increase RPM until the high RPM mode operating RPM is reached.

Figure 7:
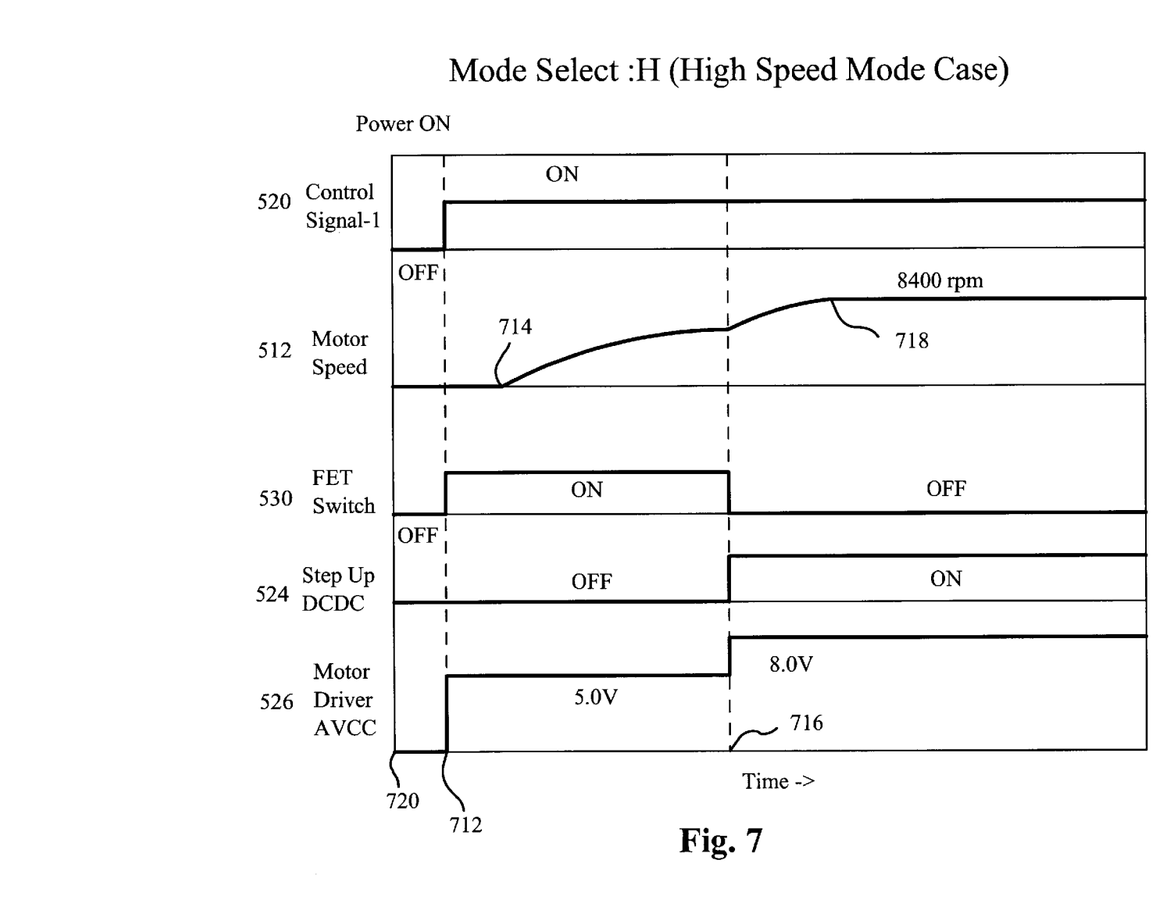
FIG. 7 is a timing diagram for a spindle motor control circuit in high RPM mode according to an embodiment of the present invention.

FIG. 7 is a timing diagram of the high RPM mode operation showing the component and signal states from the initial power off zero RPM condition to the high RPM mode operating RPM (e.g. 8400 RPM). From time zero 720 to the moment just before time 716, the timing diagram is the same as FIG. 6 from time zero 616 to time 618 when the speed reaches 4200 RPM. This corresponds to the first stage spin up as described above.

At time 716, the target switchover speed 4200 RPM is reached by the spindle motor speed 512, and the MPU 504 changes the Control Signal 520 to low. This turns the FET switch 530 off and the DC—DC step up converter 524 on. The DC—DC step up converter increases the input standard +5.0 V supply voltage to an +8.0 V output voltage that is fed into the spindle motor driver AVCC 526. This is illustrated by the increase of the motor driver AVCC voltage from +5.0 V to +8.0 V at time 716 in FIG. 7. The spindle motor driver then increases the current output to the spindle motor (not shown in FIG. 7). The spindle motor speed 512 continues to increase from 4200 RPM to the 8400 RPM.

At time 718, 8400 RPM is reached and the MPU 504 maintains the spindle motor speed at 8400 RPM.

The efficiency of the DC—DC step up converter is approximately 85% in the case of a 5.0 V–8.0 V conversion and therefore the power loss is small. However, power loss and high efficiency is not the paramount concern in the high RPM mode because this mode will only be selected when AC power is being used and AC power is practically unlimited.

By using this 2-stage spin up process, a lower power capacity DC—DC step up converter can be used. For example, if the DC—DC step up converter is used from the spin up (zero RPM) all the way to 8400 RPM, the power requirement would be 1.0 A ×8.0 V=8.0 W. However, using the 2-stage spin up method, the power requirement would be 300 mA×8.0 V=2.4 W which is significantly lower than 8.0 W. Because the power consumed is lower, the thermal rise in the lower power capacity DC—DC step up converter is minimized.

The spindle motor control circuit described the preceding sections is for the control of a dual speed spindle motor. However, this circuit can be easily adapted to provide control for multiple speeds. Multiple FET switch and DC—DC step up converter pairs can be used to provide the different voltage conversions at different speeds. The MPU can also be modified to accept multiple digital input signals that signify different speeds, and send out multiple control signals to the FET switch and DC—DC step up converter pairs.

Figure 8:
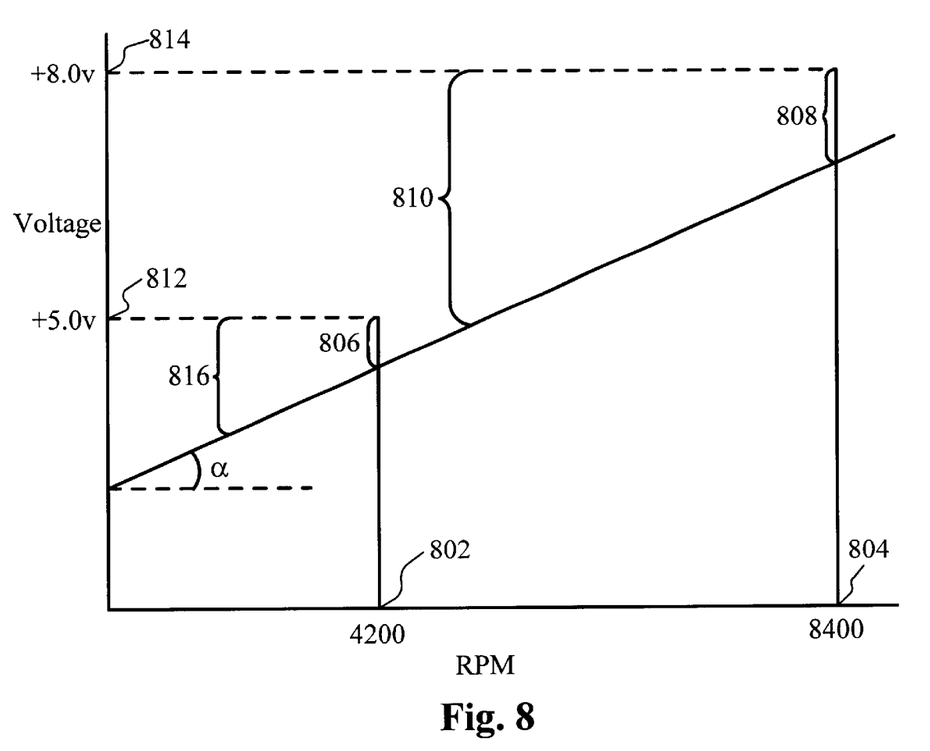
FIG. 8 is a graph illustrating the optimization of a spindle motor in use in the present invention.

FIG. 8 illustrates how a spindle motor is optimized for use in the present invention. A low RPM speed 802 such as 4200 RPM is chosen. A spindle motor is designed to operate at 4200 RPM with a voltage slightly below +5.0 V 812 with the minimal loss to the spindle motor driver which is represented by a voltage drop 806. As the graph illustrates, as the spindle motor speed drops below 4200 RPM, the voltage drop in the driver 816 increases making the spindle motor more inefficient. At +5.0 V, the spindle motor is operating at maximum efficiency.

A high RPM speed 804 such as 8400 RPM is chosen and a higher voltage 814 that is necessary to attain this RPM is determined from experimental data. At this RPM, there are also losses to the spindle motor driver represented by voltage drop 808.

However, in order to reach +8.0 V, or whatever higher voltage is necessary to reach the higher RPM, a voltage converter such as a DC—DC step up converter is necessary. This voltage converter will introduce some inefficiency and therefore will lower the overall efficiency of the spindle motor controller.

Therefore, the spindle motor control is operating at the maximum efficiency in the low RPM speed, and at a slightly lower efficiency in the high RPM speed.

Figure 9:
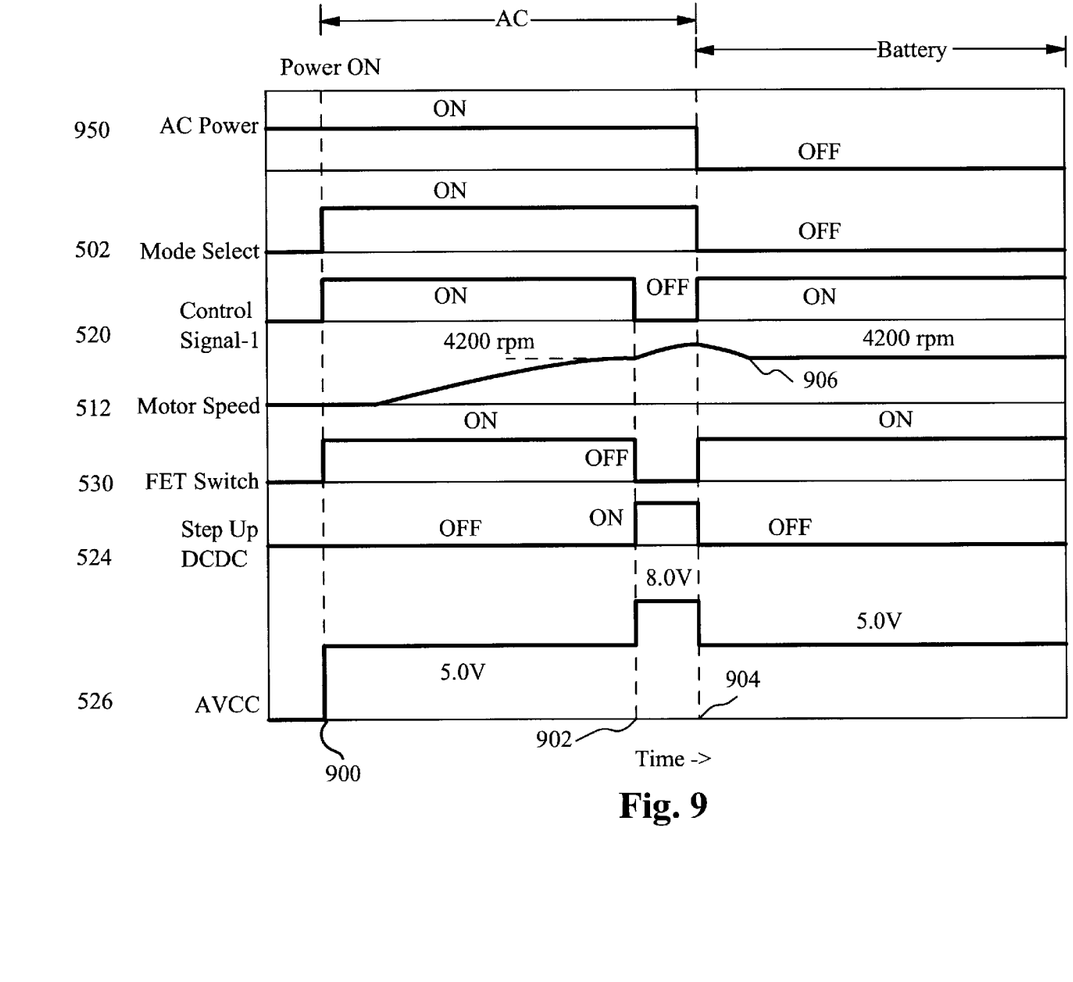
FIG. 9 is a timing diagram for a spindle motor control circuit in transition from high RPM mode to low RPM mode during spin up.

FIG. 9 is a timing diagram that shows a special event where AC power is removed and replaced by battery power during the spin up process. At time 900, the power to the hard drive is turned on. AC power 950 is initially on, signaling the high RPM mode is selected. The 2-stage spin up process is used to bring the spindle motor from zero RPM to 8400 RPM. The time between 900 and 902 represents the first stage of the spin up process. From time 902 to 904, the spindle motor is going through the second stage of the spin up process where the DC—DC step up converter is used to bring the spindle motor to 8400 RPM. Immediately prior to time 904, the spindle motor is still in the second stage of the spin up process and the spindle motor has not reached 8400 RPM. At time 904, the AC power is turned off, and by default, battery power will be used. The spindle motor is not yet in the low RPM mode. The DC—DC step up converter 524 is turned off, and the voltage at AVCC 526 is switched back to the standard supply voltage of +5.0 V. The motor speed 512 gradually decreases and at time 906, reaches 4200 RPM and remains at that RPM until there is a mode change.

Figure 10:
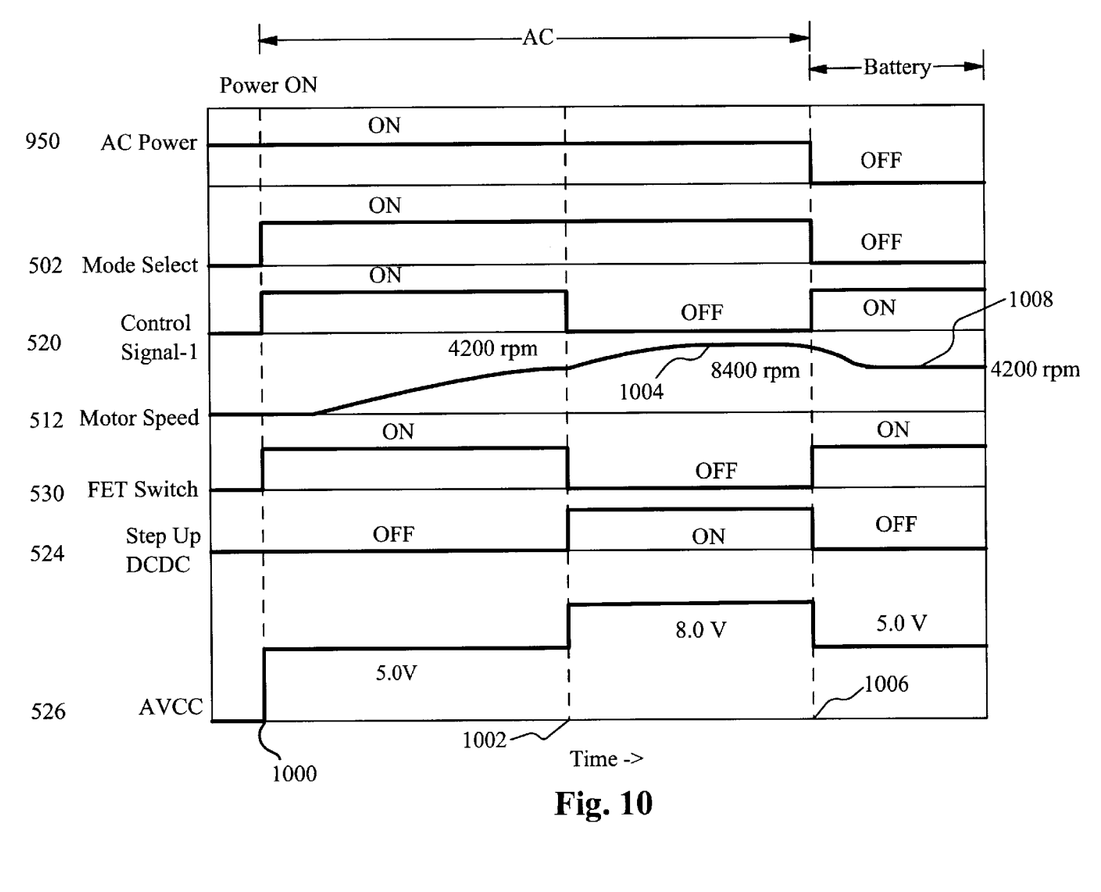
FIG. 10 is a timing diagram for a spindle motor control circuit in transition from high RPM mode to low RPM mode.

FIG. 10 is a timing diagram that shows the event where the AC power is turned off when the spindle motor is in normal high RPM mode operation. Time period 1000 to 1006 shows the spindle motor going from the 2-stage spin up process to the normal operation at 8400 RPM. At time 1002, the switchover RPM (4200 RPM) is reached and the DC—DC step up converter turns on. The motor speed continues to increase until time 1004 when 8400 RPM is reached and the spindle motor is in normal high RPM mode operation. At time 1006, the AC power is removed and by default, battery power is used. The DC—DC step up converter is switched off and the motor speed gradually decreases to 4200 RPM. At time 1008, the motor speed 512 reaches 4200 RPM and is maintained at that RPM for normal low RPM mode operation.

Figure 11:
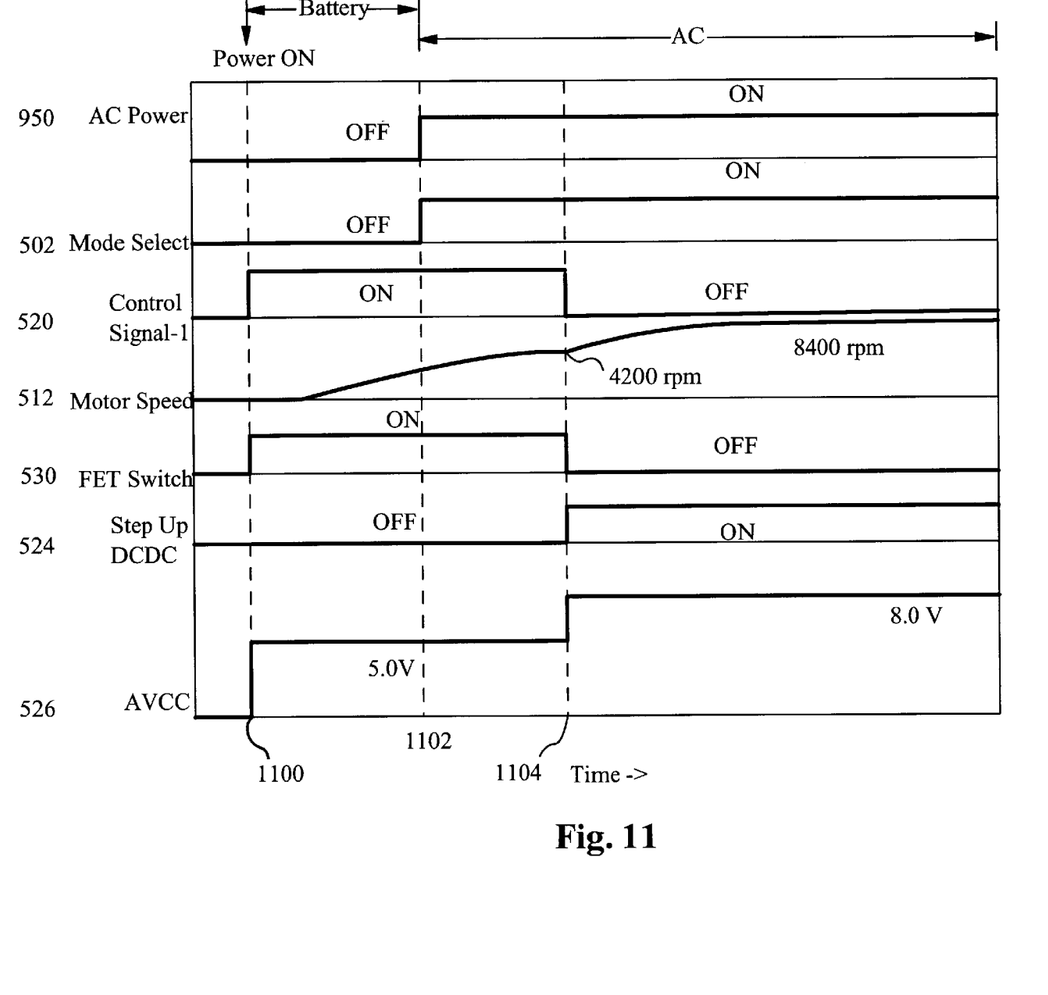
FIG. 11 is a timing diagram for a spindle motor control circuit in transition from low RPM mode to high RPM mode during spin up.

FIG. 11 is a timing diagram showing the event where AC power is connected during spin up where battery power was in use. At time 1100, the power to the hard disk is turned on. This power is coming from the battery. The spindle motor begins to spin up in the normal low RPM mode. While the spindle motor is still in the spin up process, AC power is connected at time 1102. The spindle motor is now in high RPM mode. However, since the switchover RPM, 4200 RPM in this case, has not been reached, the spindle motor is still in the first stage of the 2-stage spin up process. Since the first stage of the 2-stage spin up process is the same as the spin up process in the low RPM mode, the spindle motor continues to spin up as though it was still in the low RPM mode spin up process. At time 1104, the switchover RPM of 4200 RPM has been reached and the spindle motor goes into the second stage of the spin up process. The DC—DC step up converter turns on and the motor speed 512 increases until 8400 RPM is reached.

Figure 12:
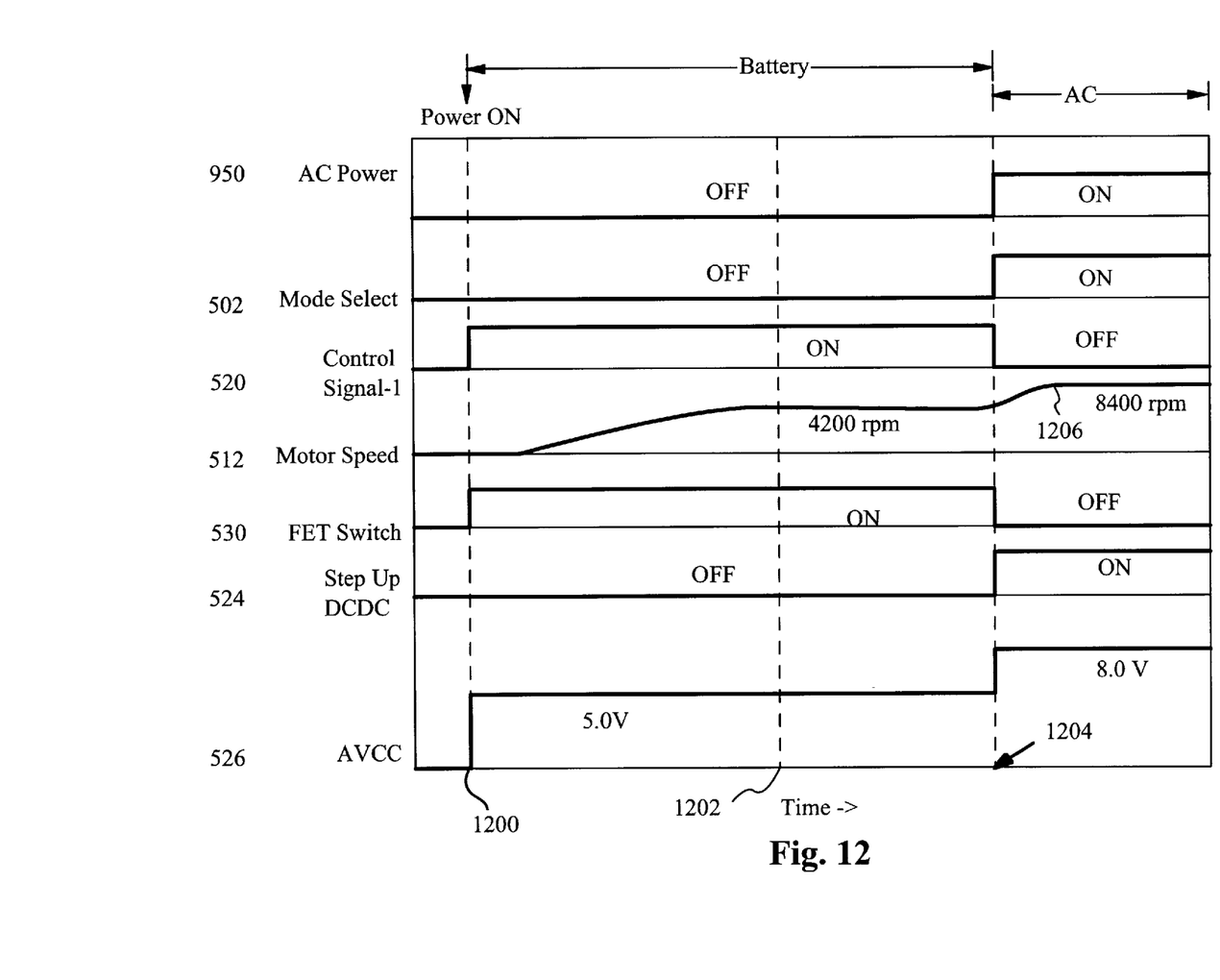
FIG. 12 is a timing diagram for a spindle motor control circuit in transition from low RPM mode to high RPM mode.

FIG. 12 is a timing diagram showing the event where AC power is connected when the spindle motor is in normal low RPM mode. From time 1200 to 1202, the spindle motor is in the low RPM mode spin up process. From 1202 to the time just before 1204, the spindle motor is in the normal low RPM mode operation, spinning at 4200 RPM. At time 1204, the AC power is connected and the high RPM mode is now selected. Since the spindle motor is already spinning at 4200 RPM, which is also the switchover RPM, the spindle motor immediately goes into the second stage of the 2-stage spin up process. The DC—DC step up converter turns on and the motor speed 512 increases to 8400 RPM. At time 1206, 8400 RPM is reached and the spindle motor is in the high RPM mode operation.

Although the preceding description of the present invention contains many specifics for a dual speed motor control circuit, anyone skill in the art will appreciate that many variations and alterations are within the scope of the invention. Accordingly, the scope of the invention should be determined by the following claims and their legal equivalents.

What is claimed is:

1. A spindle motor system comprising:
    a spindle motor optimized for maximum efficiency at a specific low RPM when on battery power; and
    a spindle motor control circuit configured to operate the spindle motor at the specific low RPM when on the battery power and at one or more higher RPM when on AC power.

2. The system as claimed in claim 1 wherein the spindle motor is optimized for maximum efficiency at the low RPM when a sum of a spindle motor back-emf, a voltage associated with a spindle motor losses, and a minimum voltage drop of a motor driver are substantially equal to a supply voltage.

3. The system as claimed in claim 2 wherein the spindle motor losses comprise of losses due to the resistance and eddy currents in the spindle motor.

4. The system as claimed in claim 1 wherein a voltage converter is used to operate the spindle motor at speeds such that a sum of the motor back-emf voltage, a voltage associated with the spindle motor losses, and a minimum voltage due to a voltage drop in a motor driver exceeds a supply voltage.

5. The system as claimed in claim 1 wherein the spindle motor control circuit comprises:
    a) a motor driver configured for increasing and decreasing current supply to the spindle motor;
    b) a switching means configured to be controlled by a control signal;
    c) a voltage converter configured to convert an input voltage to a higher output voltage;
    d) a main processor unit.

6. The system as claimed in claim 5 wherein the main processor unit is configured to:
    i) accept a digital input signal;
    ii) accept a feedback signal of the speed of the spindle motor from the motor driver;
    iii) provide a control signal based on the state of the digital input signal to control the switching means and the voltage converter;
    iv) provide a data signal to the motor driver based on the feedback signal from the motor driver.

7. The system as claimed in claim 5 wherein the motor driver is a linear motor driver.

8. The system as claimed in claim 5 wherein the motor driver is a PWM motor driver.

9. The system as claimed in claim 5 wherein the switching means is a field effect transistor.

10. The system as claimed in claim 5 wherein the switching means is an analog switch.

11. The system as claimed in claim 5 wherein the switching means is a bipolar transistor.

12. The system as claimed in claim 5 wherein the voltage converter is a DC—DC step up converter.

13. The system as claimed in claim 5 wherein the voltage converter is a switched-capacitor type converter.

14. The system as claimed in claim 5 wherein the voltage converter is a charge pump.

15. The system as claimed in claim 6 wherein a MPU receives an digital input signal indicating whether the spindle motor should be operated in low RPM or high RPM, and subsequently sends a control signal to the switching means and the voltage converter.

16. The system as claimed in claim 5 wherein the output voltage of the voltage converter is higher than a supply voltage, when the converter is on, and that the output of the voltage converter is high impedance when the converter is off.

17. The system as claimed in claim 6 wherein when the digital input signal is in the low RPM state:
    a) the Control Signal is high;
    b) the switching means is on;
    c) the voltage converter is off;
    d) the voltage supplied to the spindle motor driver is from the switching means which is the standard supply voltage; and
    wherein when the digital input signal is in the high RPM state:
    a) the Control Signal is low;
    b) the switching means is off;
    c) the voltage converter is on;
    d) the voltage supplied to the spindle motor driver is from the voltage converter output voltage which is higher than the standard supply voltage.

18. A hard disk drive system comprises:
    a spindle motor optimized for maximum efficiency at a specific low RPM when on battery power;
    a spindle motor control circuit configured to operate the spindle motor at the specific low RPM when on the battery power and at one or more higher RPM when on AC power;
    a magnetic data storage disk; and
    a means of reading and writing data to the magnetic data storage disk.

19. The system as claimed in claim 18 wherein the spindle motor control circuit is configured to operate the spindle motor optimized for maximum efficiency at the specific RPM such that a sum of the spindle motor back-emf voltage, a voltage associated with a spindle motor losses, and a minimum voltage drop of a motor driver are substantially equal to a supply voltage.

20. The system as claimed in claim 18 wherein the spindle motor losses comprise of losses due to the resistance and eddy currents in the spindle motor.

21. The system as claimed in claim 18 wherein a voltage converter is used to operate the spindle motor at speeds such that a sum of the motor back-emf voltage, a voltage associated with the spindle motor losses, and a minimum voltage due to a voltage drop in a motor driver exceeds a supply voltage.

22. A computer system comprising of a hard disk drive configured to operate in high RPM when on AC power and in low RPM when on battery power.

23. The system as claimed in claim 22 wherein the hard disk drive comprises of:
- a spindle motor optimized for maximum efficiency at a specific RPM;
- a spindle motor control circuit configured to operate the spindle motor at the specific RPM and at one or more higher RPM;
- a magnetic data storage disk; and
- a means of reading and writing data to the magnetic data storage disk.

24. The system as claimed in claim 23 wherein the spindle motor control circuit is configured to operate the spindle motor optimized for maximum efficiency at the specific RPM such that a sum of a spindle motor back-emf voltage, a voltage associated with a spindle motor losses, and a minimum voltage drop of a motor driver are substantially equal to a supply voltage.

25. The system as claimed in claim 23 wherein the spindle motor losses comprise of losses due to the resistance and eddy currents in the spindle motor.

26. The system as claimed in claim 23 wherein a voltage converter is used to operate the spindle motor at speeds such that a sum of the motor back-emf voltage, a voltage associated with the spindle motor losses, and a minimum voltage due to a voltage drop in a motor driver exceeds a supply voltage.

* * * * *